(12) United States Patent
Kroon et al.

(10) Patent No.: US 6,620,051 B2
(45) Date of Patent: Sep. 16, 2003

(54) FAIRGROUND ATTRACTION

(75) Inventors: Louisito Johannes Eusebio Kroon, Neede (NL); Albert Louisito Phillipus Kroon, Neede (NL)

(73) Assignee: Cobra Beheer B.V., Aeneede (NL)

( * ) Notice: Subject to any disclaimer, the term of this patent is extended or adjusted under 35 U.S.C. 154(b) by 0 days.

(21) Appl. No.: 10/106,073

(22) Filed: Mar. 27, 2002

(65) Prior Publication Data

US 2003/0027642 A1 Feb. 6, 2003

(30) Foreign Application Priority Data

Mar. 28, 2001 (NL) .............................................. 1017725

(51) Int. Cl.⁷ ................................................ A63G 1/28
(52) U.S. Cl. .............................. 472/31; 472/3; 472/477
(58) Field of Search ................................ 472/3, 32, 33, 472/44, 45, 46, 47, 133

(56) References Cited

U.S. PATENT DOCUMENTS

| | | | | |
|---|---|---|---|---|
| 4,007,926 A | * | 2/1977 | Ottaway | 472/29 |
| 4,342,483 A | * | 8/1982 | Takada | 297/488 |
| 4,700,632 A | * | 10/1987 | Schmutz | 104/63 |
| 5,026,115 A | * | 6/1991 | Barnes | 297/219.12 |
| 5,489,212 A | | 2/1996 | Yoshimoto et al. | |
| 5,529,382 A | * | 6/1996 | Burkat | 297/487 |
| 5,688,178 A | | 11/1997 | Emrie | |
| 5,791,998 A | * | 8/1998 | Moser et al. | 472/31 |
| 5,931,740 A | * | 8/1999 | Kitchen | 472/118 |
| 5,947,828 A | * | 9/1999 | Fabbri | 472/30 |
| 5,964,665 A | * | 10/1999 | Uemura | 472/45 |
| 6,022,276 A | * | 2/2000 | Knijpstra | 472/33 |

FOREIGN PATENT DOCUMENTS

| | | |
|---|---|---|
| DE | 32 37 684 A1 | 4/1983 |
| DE | 36 29 495 A1 | 3/1987 |
| DE | 0 545 860 A1 | 6/1993 |

\* cited by examiner

*Primary Examiner*—Kien T. Nguyen
(74) *Attorney, Agent, or Firm*—Oliff & Berridge, PLC

(57) ABSTRACT

An installation for moving a person along a path such that the body of said person is subjected to certain speeds and/or accelerations including a frame, a main arm movably joined to said frame at a horizontal axis and a further arm that is mounted by means of a rotary joint on the end of the main arm, a driver for driving the arm, as well as at least one seat that is constructed to hold a person securely in place.

2 Claims, 3 Drawing Sheets

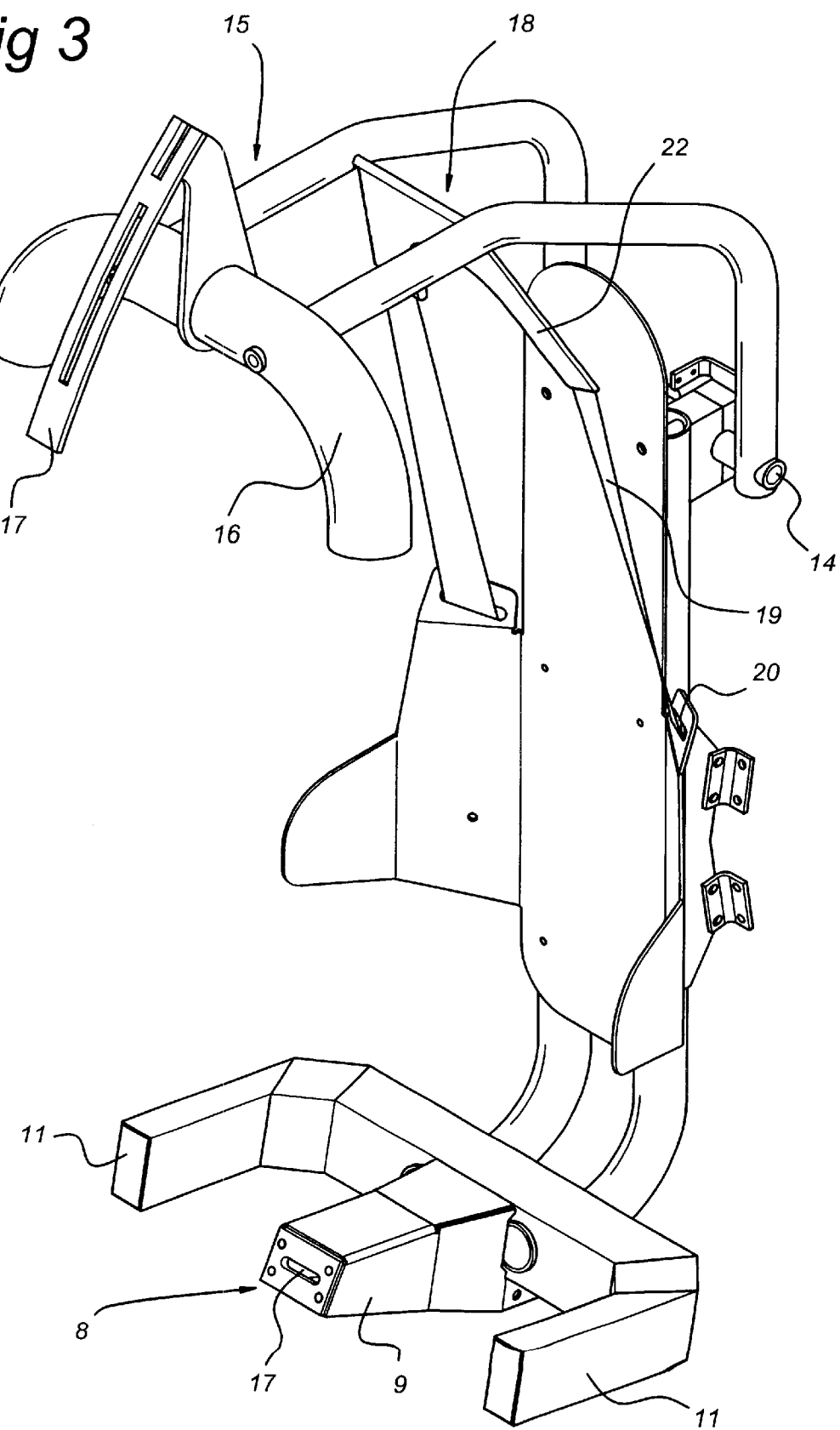

FAIRGROUND ATTRACTION

BACKGROUND OF THE INVENTION

1. Field of Invention

The invention relates to an installation for moving a person along a path such that the body of said person is subjected to certain speeds and/or accelerations, including a frame, a main arm rotatably joined to said frame at a horizontal axis, driver for driving the main arm, at least one further arm that is mounted by means of a rotary joint on the end of the main arm, as well as at least one accommodating means that is constructed to hold a person securely in place.

2. Description of Related Art

An installation of this type is known and is used, for example, as an attraction in fairgrounds and in amusement parks. The people who have occupied a seat in the attraction experience a sensation during the various movements and accelerations to which they are subjected. These movements depend, inter alia, on the kinematic characteristics of the installations which, for example, have multiple arms, hinge points and points of rotation, and the like. The movement pattern obtained as a result is usually characterised by many bends following on from one another, which yields accelerations which lead to a specific experience. In the case of the known installation the people are seated on a bench or seat, the thighs being supported approximately horizontally.

SUMMARY OF THE INVENTION

The aim of the invention is to provide an installation that adds an extra dimension to the experience to which the person is subjected during the movements of the installation. Said aim is achieved in that the accommodating means are connected to the at least one further arm, said main arm comprising two main arm parts which are joined to one another by means of a live ring, the axis of rotation of which is non-perpendicular with respect to the axis of rotation of the rotary joint.

BRIEF DESCRIPTION OF THE DRAWINGS

FIG. 3 shows a perspective view of the accommodating means without covering, with the restraint open.

DETAILED DESCRIPTION OF PREFERRED EMBODIMENTS

Figure 1:
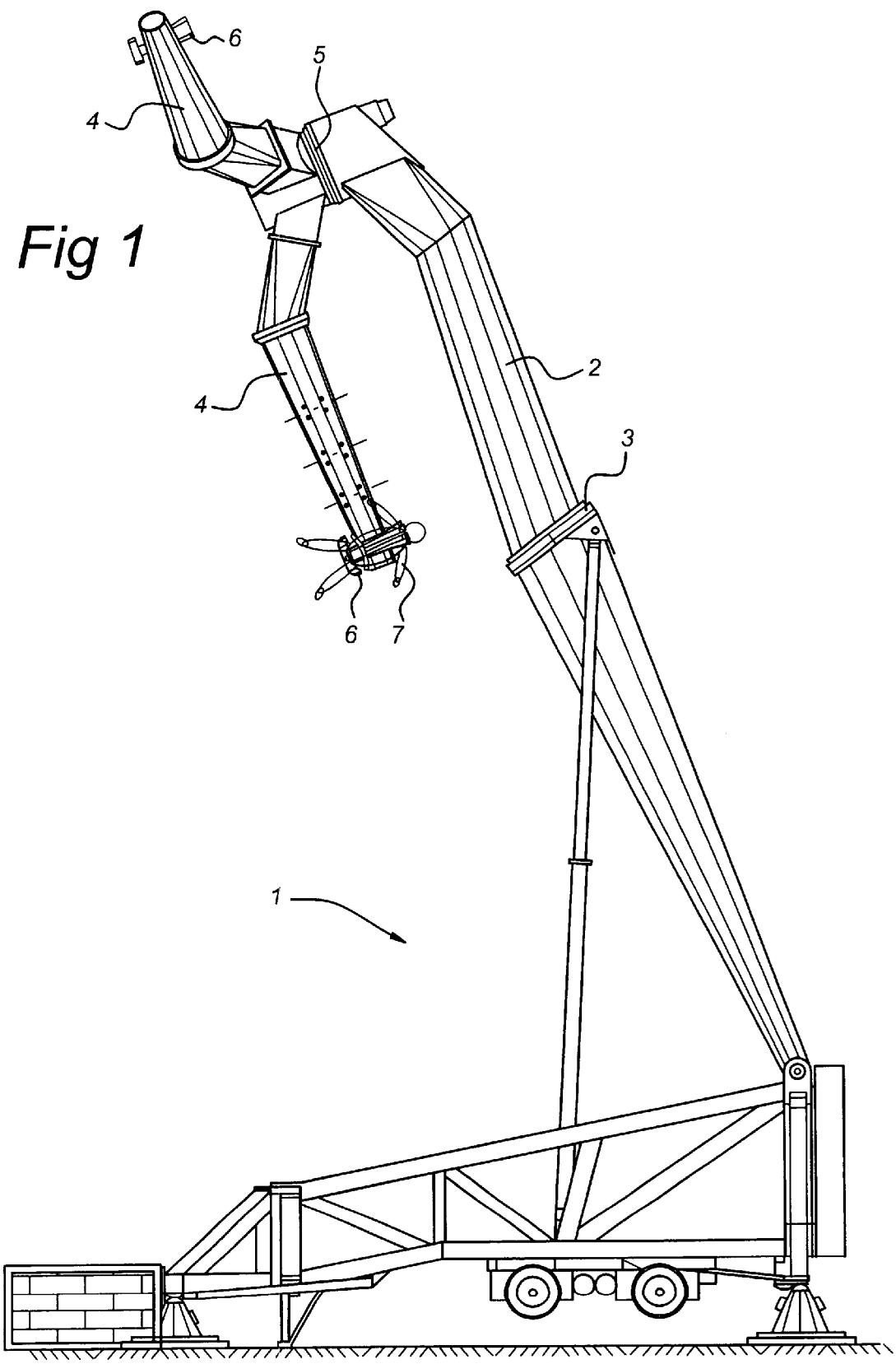
FIG. 1 shows a perspective view of the installation.

The installation, such as a fairground attraction, shown in FIG. 1 comprises a frame 1 on which a supporting arm 2 is located. Said supporting arm 2 is able to rotate above the frame 1 by means of the live ring 3.

Three arms 4, two of which can be seen, are mounted at the end of the supporting arm 2. Said arms 4 can be rotated with respect to the supporting arm 2 by means of the live ring 5. The supporting arm 2 and the arms 4 can be moved by means of hydraulic or electrical drives, which are known per se and are not shown in more detail.

In the illustrative embodiment shown, four sets of accommodating means 6, on which a person 7 can be present, are mounted on each of the arms 4.

Figure 2:
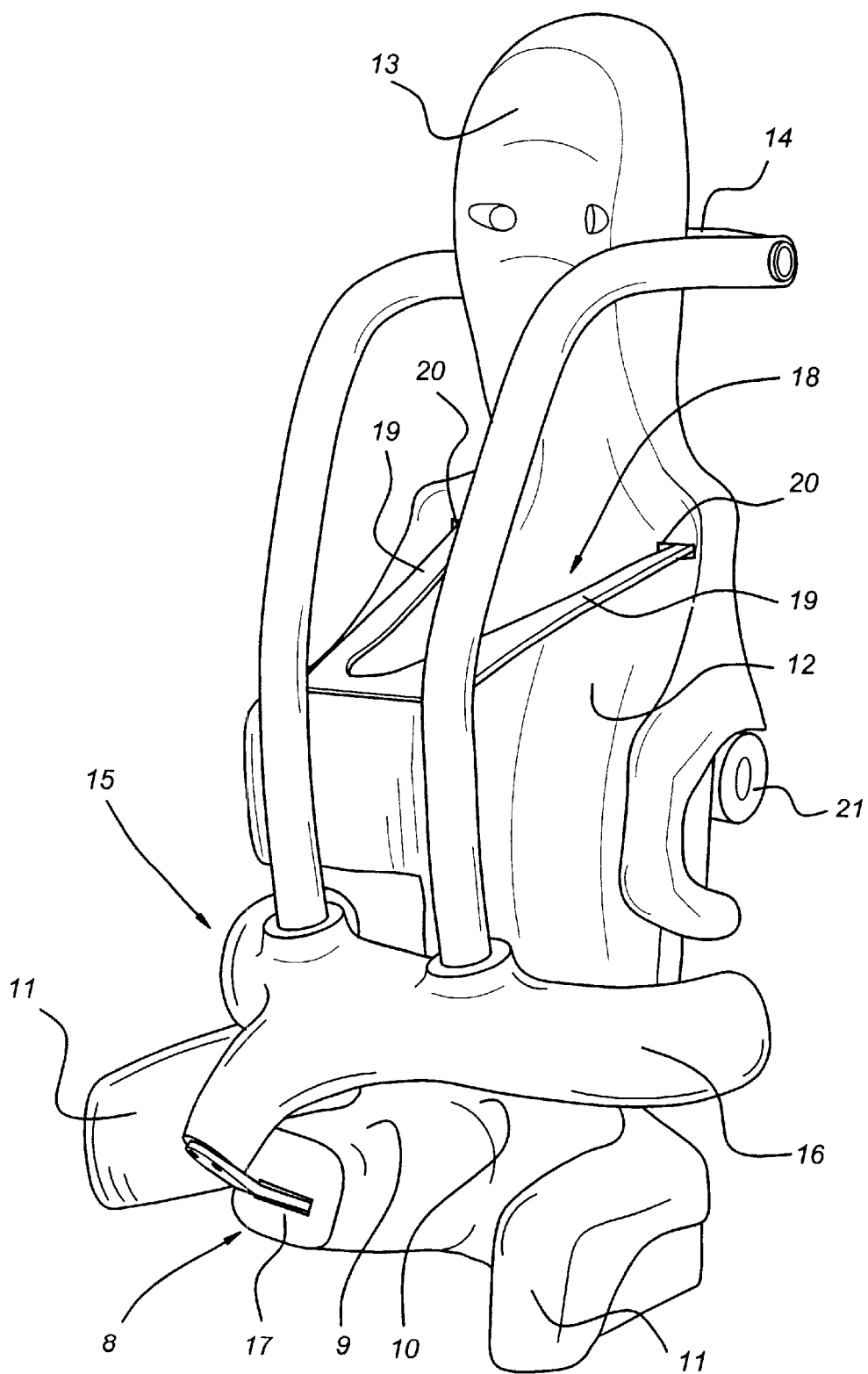
FIG. 2 shows a perspective view of the complete accommodating means according to the invention.

The accommodating means 6 are shown in more detail in FIG. 2. These accommodating means comprise a saddle-shaped part 8, on which, as is shown in FIG. 1, the person 7 is able to sit astride. This means that the person's legs hang freely downwards alongside the central support 9 of the saddle-shaped part 8. The saddle-shaped part 8 furthermore comprises a seat 10, with respect to which the central support extends. In connection with safety, enclosing arms 11 are provided on either side of the central support 9. Therefore, each of the person's legs extends freely and straight downwards between one of the enclosing arms 11 and the central support 9.

Furthermore, the accommodating means comprise a backrest 12, at the bottom of which the saddle-shaped part 8 is arranged. The backrest 12 is extended at the top by a headrest 13, which supports a hinge pin 14 for the restraint indicated in its entirety by 15. This restraint has a front support 16, which is at the level of the middle of the person.

Locking means 17 are also provided, by means of which the restraint 15 can be locked with respect to the central support 9.

In order to be able properly to restrain persons of different size, a safety harness 18 is fitted. This safety harness comprises two belts 19, which at one end are connected to the restraint 15 and at the other end are guided via an eye 20 in the backrest to a reel mechanism 21.

When the restraint 15 is closed the belts 19 come to bear on the person's shoulders, During this operation the reel mechanism 21 plays out as far as is necessary, depending on the size of the person, Since this reel mechanism is also provided with locking to prevent rapid or sudden playing out, the person can thus be safely restrained.

In FIG. 3 the accommodating means are shown without covering, that is to say only the metal frame can be seen in FIG. 3.

It can also be seen that the belts 19 are moved upwards with the restraint 15. As a result it is easy for the person to sit down. As soon as the restraint 15 is lowered and the looking 17 comes into operation the person is well secured by the belts 19.

The belts 19 also have a support section 22, which ensures that even people of smaller stature can be secured.

What is claimed is:

1. Installation for moving a person along a path such that the body of said person is subjected to certain speeds and/or accelerations, comprising:

a frame, a main arm rotatably joined to said frame by means of a horizontal axis, drive means for driving the main arm, at least one further arm that is mounted by means of a rotary joint on the end of the main arm, as well as at least one accommodating means that is constructed to hold a person securely in place, said accommodating means being connected to the at least one further arm, said main arm comprising two main arm parts which are joined to one another by means of a live ring, the axis of rotation of which is non-perpendicular with respect to the axis of rotation of the rotary joint.

2. Installation according to claim 1, wherein two or more arms which are regularly distributed in the direction of rotation are mounted on the rotary joint.

* * * * *